United States Patent
Murray et al.

(10) Patent No.: US 10,890,158 B2
(45) Date of Patent: Jan. 12, 2021

(54) SYSTEM AND METHOD FOR INITIALIZING STARTUP OF A WIND TURBINE

(71) Applicant: General Electric Company, Schenectady, NY (US)

(72) Inventors: Megan Purcell Murray, Pewaukee, WI (US); Jignesh Govindlal Gandhi, Simpsonville, SC (US); Hammad Ahmad, Laurens, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 16/140,923

(22) Filed: Sep. 25, 2018

(65) Prior Publication Data

US 2020/0095980 A1   Mar. 26, 2020

(51) Int. Cl.
   *F03D 7/02*      (2006.01)
   *F03D 17/00*     (2016.01)

(52) U.S. Cl.
   CPC ............. *F03D 7/026* (2013.01); *F03D 17/00* (2016.05); *F05B 2260/85* (2013.01); *F05B 2270/309* (2013.01); *F05B 2270/32* (2013.01); *F05B 2270/327* (2013.01)

(58) Field of Classification Search
   CPC ............ F05B 2260/85; F05B 2270/309; F05B 2270/32; F05B 2270/327; F03D 7/026; F03D 17/00
   USPC ..................................................... 290/44, 55
   See application file for complete search history.

(56) References Cited

U.S. PATENT DOCUMENTS

| 4,193,005 A | 3/1980 | Kos et al. |
| 2003/0127862 A1* | 7/2003 | Weitkamp ............. F03D 7/0276 290/44 |
| 2007/0124025 A1* | 5/2007 | Schram ................. F03D 7/0224 700/287 |

(Continued)

FOREIGN PATENT DOCUMENTS

| EP | 2 056 210 A2 | 5/2009 |
| EP | 2 757 253 A1 | 7/2014 |

OTHER PUBLICATIONS

European Search Report, dated Feb. 5, 2020 for Application No. EP 19 19 9611.

(Continued)

*Primary Examiner* — Charles Reid, Jr.
(74) *Attorney, Agent, or Firm* — Dority & Manning, P.A.

(57) ABSTRACT

A method for initializing startup of a wind turbine includes measuring a first wind condition at the wind turbine at a first moment in time. The method also includes measuring a second wind condition at the wind turbine at a subsequent, second moment in time. Further, the method includes estimating an acceleration parameter of the wind turbine as a function of the first wind condition and the second wind condition. Moreover, the method includes comparing the acceleration parameter to a predetermined threshold. As such, the method includes initializing a first startup process for the wind turbine when the acceleration parameter is at or below a predetermined threshold. Further, the method includes initializing a second startup process for the wind turbine when the acceleration parameter exceeds a predetermined threshold, the second startup process being faster than the first startup process.

15 Claims, 6 Drawing Sheets

(56) References Cited

U.S. PATENT DOCUMENTS

| | | | |
|---|---|---|---|
| 2009/0204266 A1* | 8/2009 | Lovmand | G05B 15/02 |
| | | | 700/287 |
| 2010/0133831 A1* | 6/2010 | Scholte-Wassink | ............ |
| | | | F03D 7/0292 |
| | | | 290/44 |
| 2012/0257968 A1* | 10/2012 | Dalsgaard | F03D 7/0264 |
| | | | 416/1 |
| 2013/0038060 A1* | 2/2013 | Odgaard | F03D 7/0292 |
| | | | 290/44 |
| 2013/0103202 A1* | 4/2013 | Bowyer | F03D 7/0292 |
| | | | 700/275 |
| 2014/0152013 A1* | 6/2014 | Spruce | F03D 7/0204 |
| | | | 290/44 |
| 2015/0175101 A1* | 6/2015 | Klemen | H02P 5/60 |
| | | | 290/4 C |
| 2015/0308413 A1* | 10/2015 | Bhaskar | F03D 7/028 |
| | | | 290/44 |
| 2017/0022972 A1* | 1/2017 | KJ R | F03D 7/0224 |
| 2017/0107973 A1 | 4/2017 | Drossel et al. | |

OTHER PUBLICATIONS

Jwusheng Hu et al., Start/Stop Control of Fixed-Pitch Wind Energy Turbines, Solar Energy, vol. 46, No. 1, Pergamon Press, Oxford, GB, Jan. 1, 1991, pp. 29-40.

* cited by examiner

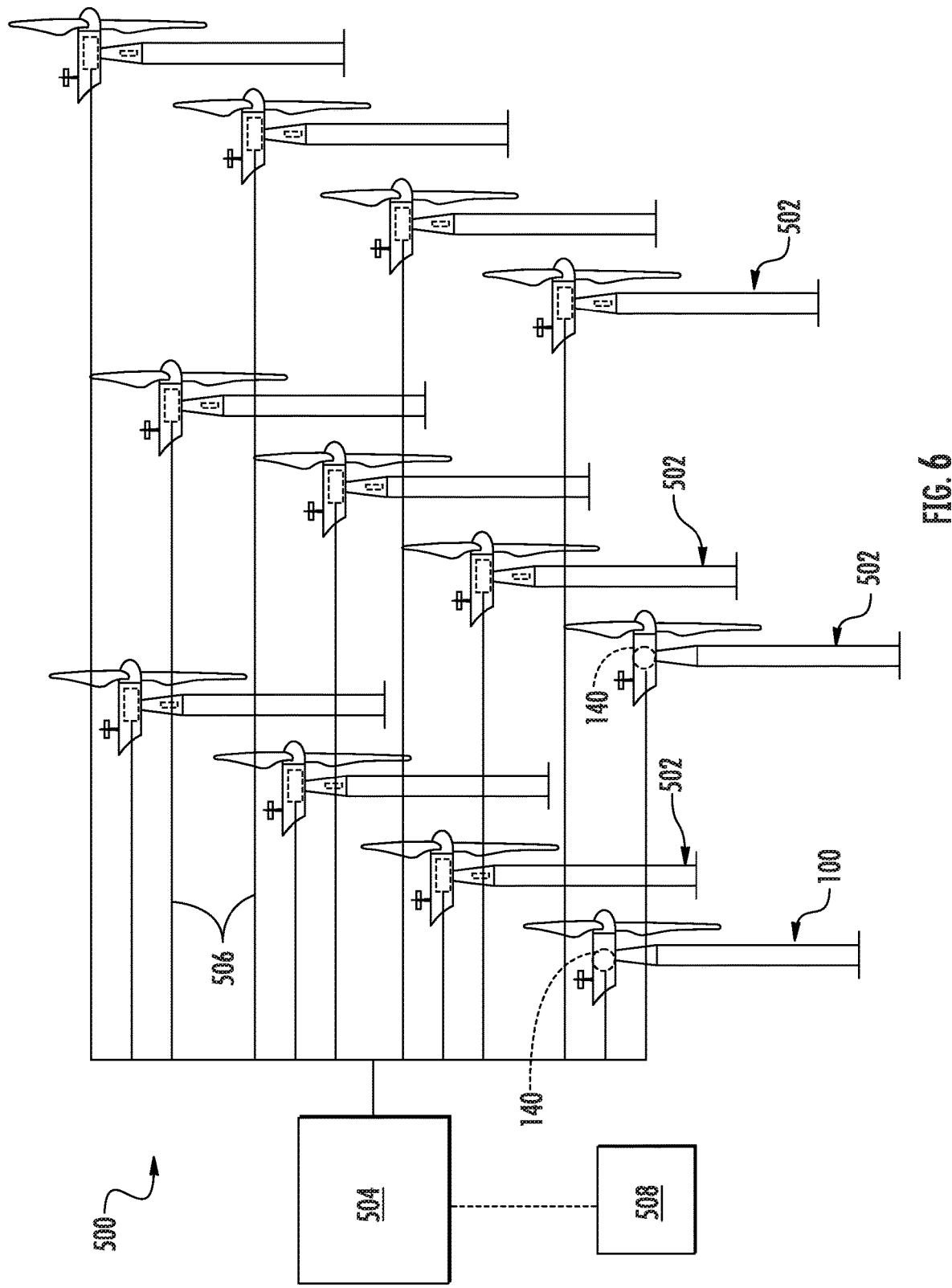

SYSTEM AND METHOD FOR INITIALIZING STARTUP OF A WIND TURBINE

FIELD

The present subject matter relates generally to wind turbines and, more particularly, to a system and method for initializing startup of a wind turbine.

BACKGROUND

Wind power is considered one of the cleanest, most environmentally friendly energy sources presently available, and wind turbines have gained increased attention in this regard. A modern wind turbine typically includes a tower, a nacelle, one or more rotor blades, a gearbox, a generator, and a power converter. The rotor blades capture kinetic energy of wind using known airfoil principles. For example, the wind turbine may include one or more pitch drive mechanisms configured to pitch the rotor blades into the wind. As such, the rotor blades transmit the kinetic energy in the form of rotational energy so as to turn a shaft coupling the rotor blades to a gearbox, or if a gearbox is not used, directly to the generator. The gearbox steps up the inherently low rotational speed of the rotor for the generator to efficiently convert the rotational mechanical energy to electrical energy, which is fed into a utility grid via at least one electrical connection. A power converter is typically used to convert a frequency of a generated electric power to a frequency substantially similar to a utility grid frequency. Conventional wind turbines also typically include a main controller to control various operational modes of the wind turbine.

As such, the turbine controller is typically configured to receive key signals that indicate readiness of the wind turbine to generate power and send commands to the power converter. More specifically, the turbine controller may receive a plurality of signals from the power converter and/or other components of the wind turbine over dedicated interfaces. Before the turbine controller commands the power converter to generate power (i.e. run), a predetermined set of conditions must first be satisfied. For example, one operating condition that is typically required for wind turbine startup is a certain minimum wind speed. Once the minimum wind speed is reached, the turbine controller begins to spin up the rotor and waits for a predetermined time period (e.g. 60 seconds) before initiating startup. The wait time serves to purpose of attempting to avoid an unsuccessful startup and unnecessary wear on the wind turbine. In addition, the wind speed is typically measured by an anemometer mounted on top of the nacelle, which may not be accurate as the wind turbine rotor begins to spin and the rotor blades disturb the wind.

Accordingly, a system and method that decreases the startup time of a wind turbine when wind conditions are favorable (i.e. wind speed is high) would be welcomed in the technology. In addition, a system and method for initializing wind turbine startup that determines the wind conditions and certainty of startup using indicators of high wind speed, instead of the anemometer wind speed, would be advantageous.

BRIEF DESCRIPTION

Aspects and advantages of the invention will be set forth in part in the following description, or may be obvious from the description, or may be learned through practice of the invention.

In one aspect, the present disclosure is directed to a method for initializing startup of a wind turbine. The method includes measuring, via one or more sensors, a first wind condition at the wind turbine at a first moment in time. The method also includes measuring, via the one or more sensors, a second wind condition at the wind turbine at a subsequent, second moment in time. Further, the method includes estimating, via the one or more processors, an acceleration parameter of the wind turbine as a function of the first wind condition and the second wind condition. Moreover, the method includes comparing, via the one or more processors, the acceleration parameter to a predetermined threshold. As such, the method includes initializing, via the processor(s), a first startup process for the wind turbine when the acceleration parameter is at or below a predetermined threshold. Further, the method includes initializing, via the processor(s), a second startup process for the wind turbine when the acceleration parameter exceeds a predetermined threshold, the second startup process being faster than the first startup process.

In one embodiment, the method includes measuring the first wind condition when one or more rotor blades of the wind turbine are in a feathered position. In another embodiment, the method includes measuring the second wind condition when the one or more rotor blades of the wind turbine are in an intermediate position between the feather position and a power position.

In further embodiments, the first and second wind conditions may be first and second wind speeds at the wind turbine. In additional embodiments, the acceleration parameter of the wind turbine may correspond to a generator acceleration or a rotor acceleration.

In several embodiments, the method may include estimating the acceleration parameter of the wind turbine based on the difference between the first wind condition and the second wind condition as well as the time between the first and second moments in time.

In certain embodiments, the method may include immediately initializing the second startup process of the wind turbine when the acceleration parameter exceeds the predetermined threshold so as to minimize or eliminate a wait time between measuring the first and second wind conditions and the second startup process of the wind turbine. More specifically, in one embodiment, the step of initializing the first and second startup processes of the wind turbine may include pitching one or more rotor blades of the wind turbine into the wind such that a rotor of the wind turbine begins to spin, releasing a brake of the rotor, yawing a nacelle of the wind turbine into the wind, and/or increasing a speed set point of the wind turbine.

In another aspect, the present disclosure is directed to a system for initializing startup of a wind turbine. The system includes one or more sensors for measuring first and second wind conditions at first and second moments in time, respectively, and a controller communicatively coupled to the sensor(s). The controller includes at least one processor configured to perform one or more operations, including but not limited to estimating an acceleration parameter of the wind turbine as a function of the first wind condition and the second wind condition, comparing the acceleration parameter to a predetermined threshold, initializing a first startup process for the wind turbine when the acceleration parameter is at or below a predetermined threshold, and initializing a second startup process for the wind turbine when the acceleration parameter exceeds a predetermined threshold, the second startup process being faster than the first startup process. It should be understood that the system may further include any of the additional features described herein.

In yet another aspect, the present disclosure is directed to a method for initializing startup of at least one wind turbine in a wind farm. The method includes determining rate of change of a wind or blade parameter of the wind turbine. Thus, the rate of change of the wind, blade, or speed parameter may be indicative of wind speed at the wind turbine, energy in the wind, or cleanliness of one or more rotor blades of the wind turbine. Therefore, the method also includes initializing a first startup process for the wind turbine when the rate of change is at or below a predetermined threshold. Alternatively, the method includes initializing a second startup process for the wind turbine when the rate of change exceeds a predetermined threshold.

In one embodiment, the step of determining the rate of change may include measuring a first wind speed at the wind turbine when one or more rotor blades of the wind turbine are in a feathered position, measuring a second wind speed when the one or more rotor blades of the wind turbine are in an intermediate position between the feather position and a power position, and determining the rate of change as a function of the first and second wind speeds. Alternatively, the step of determining the rate of change may include directly measuring, via one or more turbine sensors, a rate of change of the generator acceleration or the rotor acceleration. In another embodiment, the method may include measuring, via one or more farm sensors, one or more wind parameters from neighboring wind turbines in the wind farm and determining the predetermined threshold based on the one or more wind parameters.

It should be understood that the method may further include any of the additional steps and/or features described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 6 illustrates a schematic diagram of one embodiment of a wind farm containing a plurality of wind turbines according to the present disclosure.

DETAILED DESCRIPTION

Figure 1:
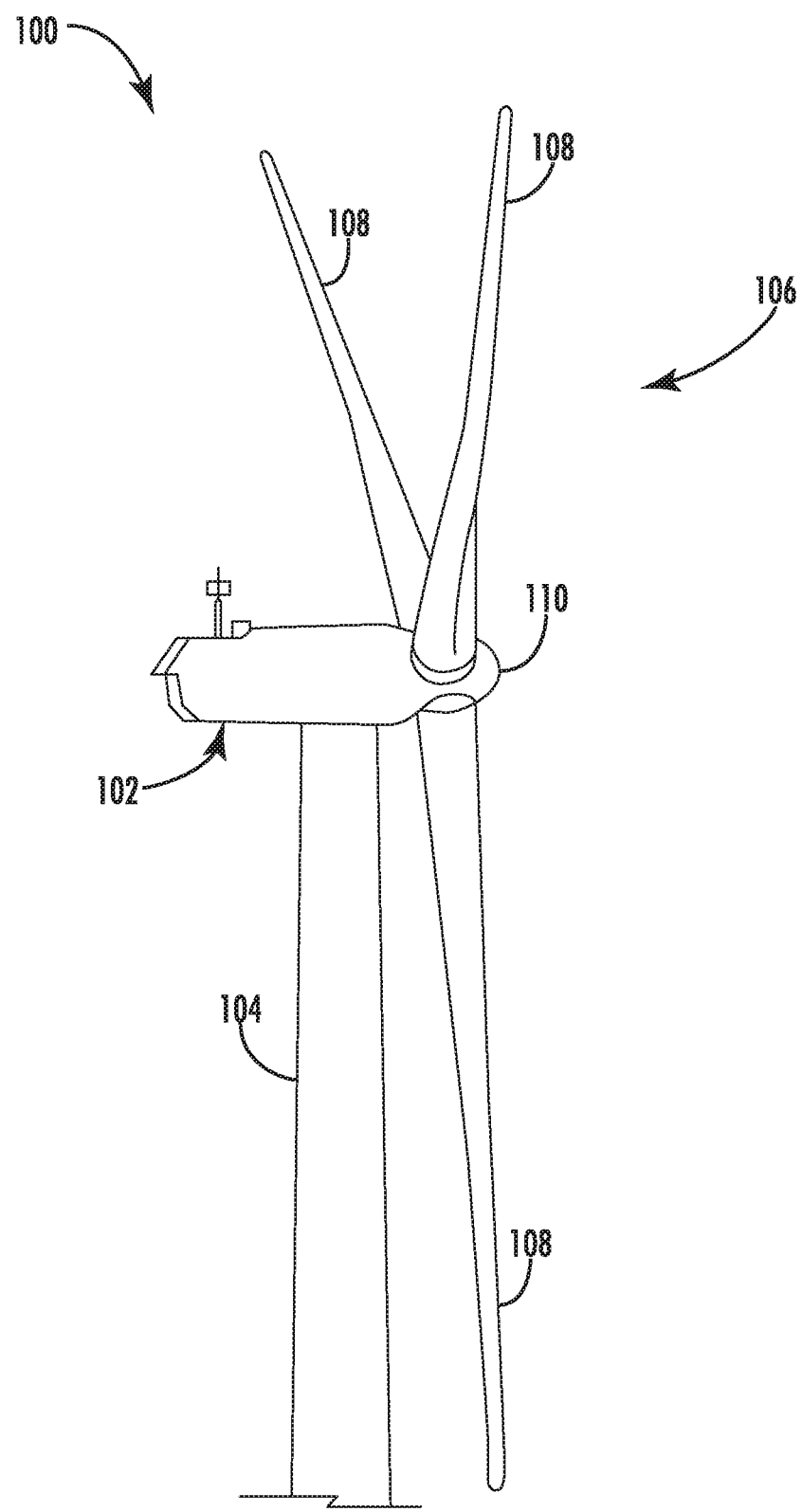
FIG. 1 illustrates a perspective view of a portion of one embodiment of a wind turbine according to the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present disclosure is directed to a system and method for adjusting wind turbine startup time based on the certainty of a successful startup. More specifically, when the wind conditions are favorable for producing power (i.e. the wind speed is high), the wind turbine will consistently be able to startup successfully. Thus, the present disclosure includes a control algorithm that includes a certainty function to differentiate between various wind conditions, which uses generator acceleration as an accurate indicator of wind conditions. The generator acceleration may be measured indirectly or directly. For example, in one embodiment, the generator acceleration may be determined by measuring the wind speed when the wind turbine rotor blades are feathered then measuring the wind speed again at an intermediate pitch angle (e.g. between feather and power). The difference and time between the two speed measurements can then be used to calculate the generator acceleration. If the generator acceleration is above a predetermined threshold, then it is assumed that wind conditions are favorable for a faster startup. If it is determined that the wind conditions are favorable for the faster startup, the turbine controller is configured to startup the wind turbine faster than conventional control methods so as to produce power sooner than the nominal case.

The present subject matter has many advantages not present in the prior art. For example, the system and method of the present disclosure is configured to reduce startup time of the wind turbine, thereby resulting in the wind turbine producing power for a greater amount of time in favorable wind conditions. Favorable wind correlates to higher power outputs, therefore, the system and method of the present disclosure assists in increasing annual energy production of the wind turbine.

Referring now to the drawings, FIG. 1 is a perspective view of a portion of an exemplary wind turbine 100 according to the present disclosure. The wind turbine 100 includes a nacelle 102 that typically houses a generator (not shown). The nacelle 102 is mounted on a tower 104 having any suitable height that facilitates operation of wind turbine 100 as described herein. The wind turbine 100 also includes a rotor 106 that includes three blades 108 attached to a rotating hub 110. Alternatively, the wind turbine 100 may include any number of blades 108 that facilitates operation of the wind turbine 100 as described herein.

Figure 2:
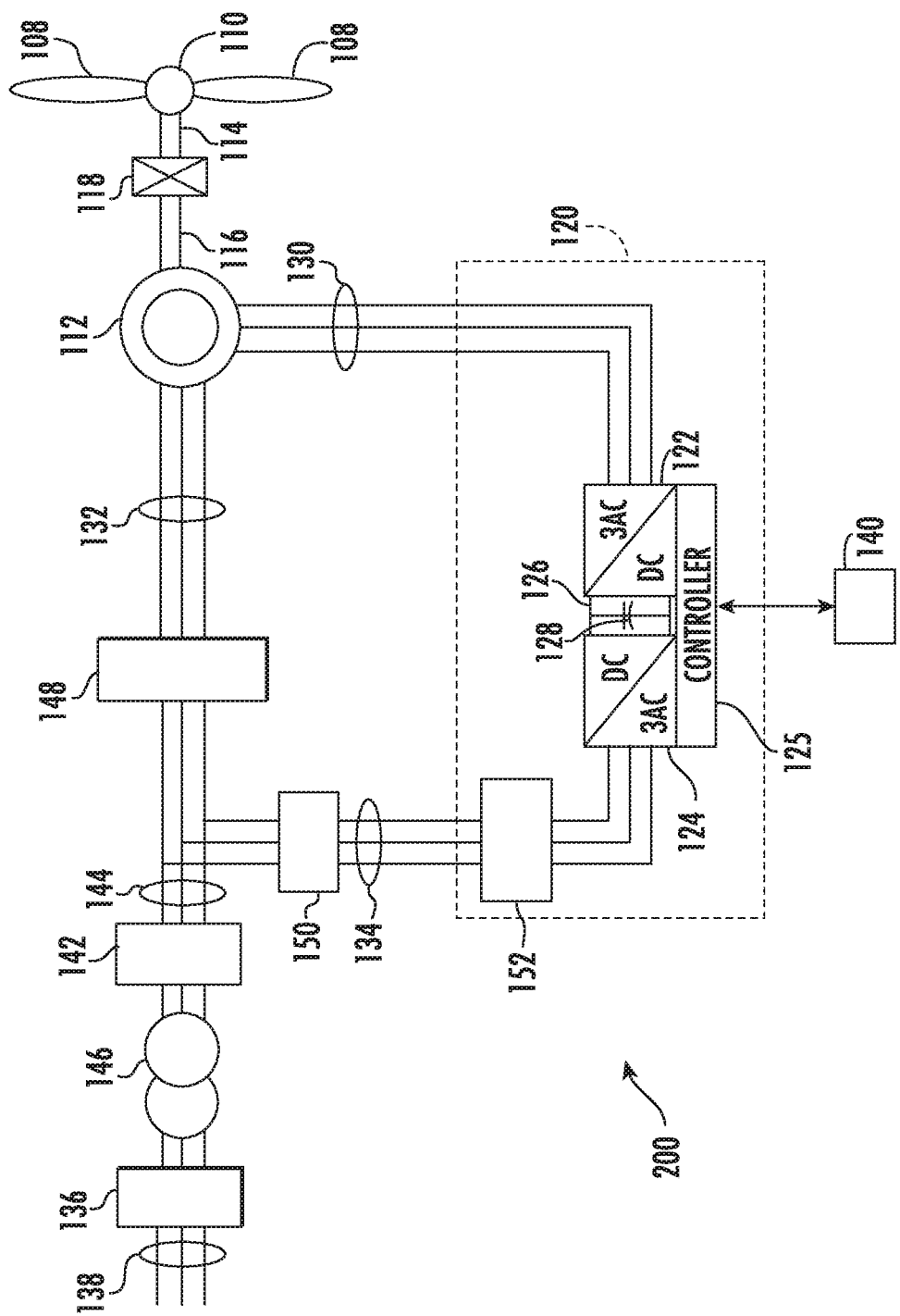
FIG. 2 illustrates a schematic view of one embodiment of an electrical and control system suitable for use with the wind turbine shown in FIG. 1.

Referring to FIG. 2, a schematic view of an exemplary electrical and control system 200 that may be used with the wind turbine 100 is illustrated. As shown, the rotor 106 includes a plurality of blades 108 coupled to the hub 110. During operation, wind impacts the blades 108 and the blades 108 transform kinetic energy from the wind into a mechanical rotational torque that rotatably drives a low-speed shaft 114 via the hub 110. The low-speed shaft 114 is configured to drive a gearbox 118 that subsequently steps up the low rotational speed of the low-speed shaft 114 to drive a high-speed shaft 116 at an increased rotational speed. The high-speed shaft 116 is generally rotatably coupled to a generator 112. In accordance with aspects of the present disclosure, the generator 112 may be a wound rotor, three-phase, double-fed induction (asynchronous) generator (DFIG). The generator 112 can be coupled to a stator bus 132 that provides an output multi-phase power (e.g. three-phase power) from a stator of the generator 112. Further, the rotor of the generator 112 can be coupled to a power converter 120 via a rotor bus 130. More specifically, the generator 112 may be coupled via the rotor bus 130 to a rotor-side converter 122, e.g. an inverter 122. The rotor-side converter 122 may be coupled to a line-side converter 124 via a DC link 126 having at least one DC link capacitor 128. Further, the line-side converter 124 may be coupled to a line side bus 134. In one embodiment, the rotor-side converter 122 and the line-side converter 124 may be configured for a normal operating mode in a three-phase, pulse width modulation (PWM) arrangement using insulated gate bipolar transistor (IGBT) switching elements.

In addition, the power converter 120 can be coupled to a controller 125 to control the operation of the rotor-side converter 122 and the line-side converter 124. It should also be noted that the controller 125 may be configured as an interface between the power converter 120 and a turbine controller 140. The controller 125 can include any number of control devices and can be used to implement the control scheme(s) disclosed herein for controlling any of the wind turbine components described herein or known to those skilled in the art.

In operation, alternating current (AC) power generated at the generator 112 by rotating the rotor 106 is provided via a dual path to the electrical grid 138. The dual paths are on the stator side by the stator bus 132 and on the rotor side by the rotor bus 130. On the rotor side, sinusoidal multi-phase (e.g. three-phase) AC power is provided to the power converter 120. The rotor-side converter 122 converts the AC power provided from the generator 112 into direct current (DC) power and provides the DC power to the DC link 126. Switching elements (e.g. IGBTs) of the rotor-side converter 122 can be modulated to convert the AC power provided from the generator 112 into DC power suitable for the DC link 126.

The line-side converter 124 converts the DC power from the DC link 126 into AC output power suitable for the electrical grid 138. In particular, switching elements (e.g. IGBTs) used in bridge circuits of the line-side power converter 124 can be modulated to convert the DC power on the DC link 126 into AC power on the line side bus 134. The AC power from the power converter 120 can be combined with the power from the stator of the generator 112 to provide multi-phase power (e.g. three-phase power) having a frequency maintained substantially at the frequency of the electrical grid 138 (e.g. 50 Hz/60 Hz).

Various line contactors, circuit breakers and switches, e.g. grid breaker 136, system circuit breaker 142, stator sync switch 148, converter breaker 150, and line contactor 152 can be included in the system 200 to connect or disconnect corresponding buses, for example, when current flow is excessive and can damage components of the wind turbine system 200 and/or for other operational considerations. Further, the system circuit breaker 142 can couple the system bus 144 to a transformer 146, which is coupled to the electrical grid 138 via grid breaker 136. Additional protection components can also be included in the wind turbine system 200.

Figure 3:
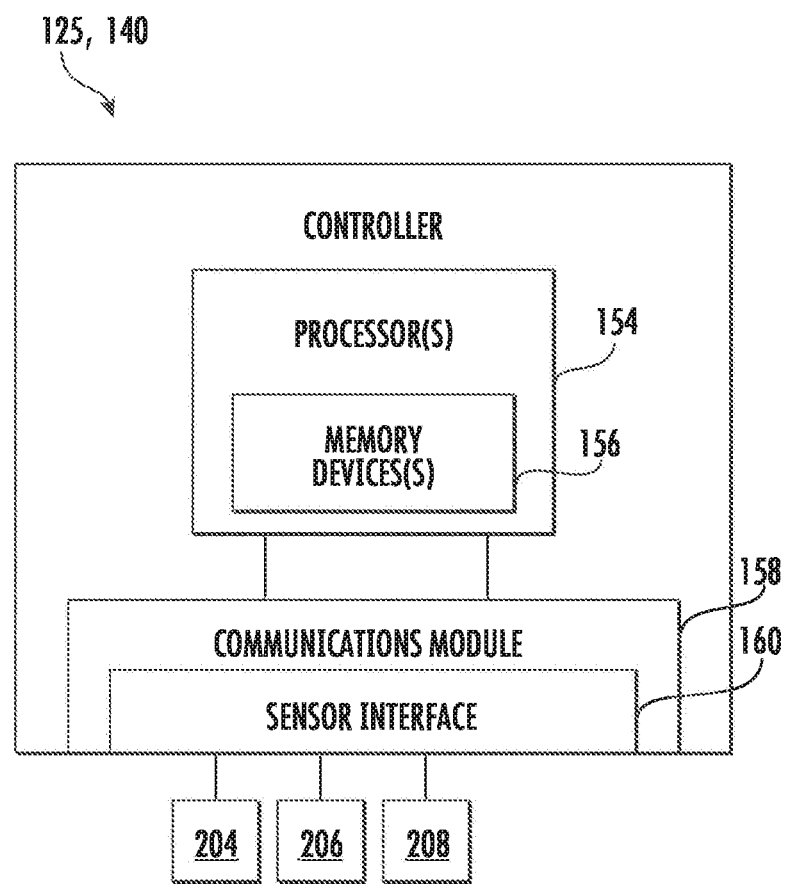
FIG. 3 illustrates a block diagram of one embodiment of a controller suitable for use with the wind turbine shown in FIG. 1.

Still referring to FIG. 2, the power converter 120 can receive control signals from, for instance, the turbine controller 140 via the converter controller 125. The control signals can be based, among other things, on sensed conditions or operating conditions of the system 200 as monitored by one or more sensors (FIG. 3). Typically, the control signals provide for control of the operation of the power converter 120. For example, feedback in the form of sensed speed of the generator 112 can be used to control the conversion of the output power from the rotor of the generator 112 to maintain a proper and balanced multi-phase (e.g. three-phase) power supply. Other feedback from other sensors can also be used by the controller 125 to control the power converter 120, including, for example, stator and rotor bus voltages and current feedbacks. Using the various forms of feedback information, switching control signals (e.g. gate timing commands for IGBTs), stator synchronizing control signals, and circuit breaker signals can be generated.

Referring now to FIG. 3, various components of the controller(s) 125, 140 of the wind turbine 100 are illustrated. As shown, the controller(s) 125, 140 may include one or more processor(s) 154 and associated memory device(s) 156 configured to perform a variety of computer-implemented functions (e.g., performing the methods, steps, calculations and the like and storing relevant data as disclosed herein). Additionally, the controller(s) 125, 140 may also include a communications module 158 to facilitate communications between the controller(s) 125, 140 and the various components of the wind turbine 100, e.g. any of the components of FIG. 2. Further, the communications module 158 may include a sensor interface 160 (e.g., one or more analog-to-digital converters) to permit signals transmitted from one or more sensors 204, 206, 208 to be converted into signals that can be understood and processed by the one or more processors 154.

It should be appreciated that the sensors 204, 206, 208 may be communicatively coupled to the communications module 158 using any suitable means. For example, as shown in FIG. 3, the sensors 204, 206, 208 are coupled to the sensor interface 160 via a wired connection. However, in other embodiments, the sensors 204, 206, 208 may be coupled to the sensor interface 160 via a wireless connection, such as by using any suitable wireless communications protocol known in the art. As such, the one or more processors 154 may be configured to receive one or more signals from the sensors 204, 206, 208.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 156 may generally include memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 156 may generally be configured to store suitable computer-readable instructions that, when implemented by the one or more processor(s) 154, configure the controller(s) 125, 140 to perform the various functions as described herein.

As mentioned, the sensors 204, 206, 208 are configured to measure and/or monitor one or more wind conditions and/or operating conditions of the wind turbine 100. In one embodiment, for example, the sensors 204, 206, 208 include may include one or more of the following: voltage and electric current sensors, blade sensors for measuring a pitch angle of one of the rotor blades 108, generator sensors for monitoring the generator (e.g. torque, rotational speed, acceleration and/or the power output), accelerometer(s), and/or various wind sensor(s) for measuring various wind parameters, such as wind speed, wind peaks, wind turbulence, wind shear, changes in wind direction, air density, temperature, pressure, or similar. Further, the sensors 204, 206, 208 may be located near the ground of the wind turbine 100, on the nacelle 102, or on a meteorological mast of the wind turbine 100.

It should also be understood that any other number or type of sensors may be employed and at any location. For example, the sensors 204, 206, 208 may be a Micro Inertial Measurement Units (MIMUs), strain gauges, accelerometers, pressure sensors, angle of attack sensors, vibration sensors, Light Detecting and Ranging (LIDAR) sensors, camera systems, fiber optic systems, anemometers, wind vanes, Sonic Detection and Ranging (SODAR) sensors, infra lasers, radiometers, pitot tubes, rawinsondes, other optical sensors, and/or any other suitable sensors.

Figure 4:
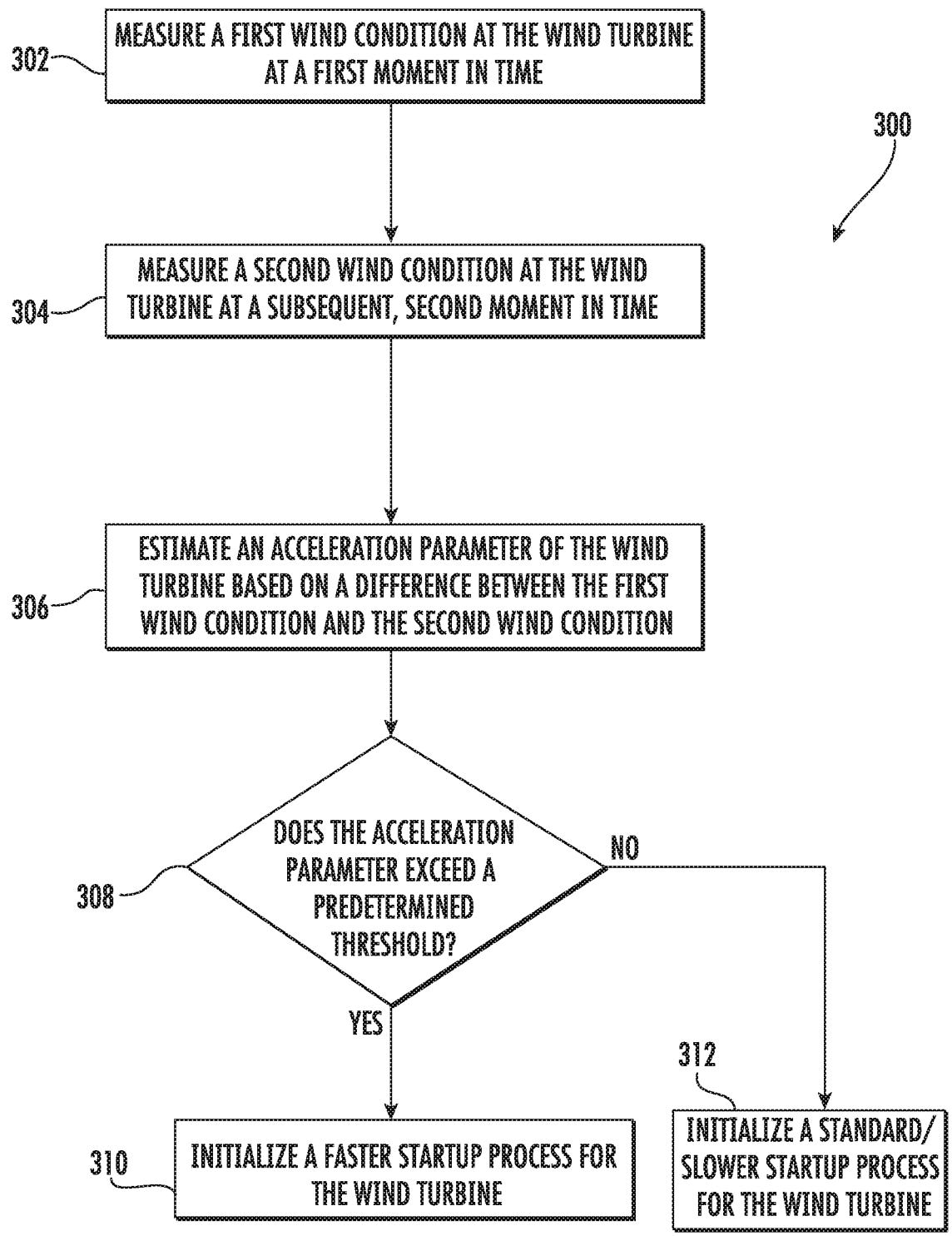
FIG. 4 illustrates a flow diagram of one embodiment of a method for initializing startup of a wind turbine according to the present disclosure.

Referring now to FIG. 4, a flow diagram of one embodiment of a method 300 for initializing startup of a wind turbine is illustrated. In general, the method 300 will be described herein with reference to the wind turbine 100 and controller 140 shown in FIGS. 1-3. However, it should be appreciated that the disclosed method 300 may be implemented with wind turbines having any other suitable configurations. In addition, although FIG. 4 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown at (302), the method 300 may include measuring a first wind condition at the wind turbine 100 at a first moment in time. More specifically, in one embodiment, the method 300 may include measuring the first wind condition when the rotor blades 108 of the wind turbine 100 are in a feathered position. As shown at (304), the method 300 may also include measuring a second wind condition at the wind turbine 100 at a subsequent, second moment in time. More specifically, in one embodiment, the method 300 may include measuring the second wind condition when the rotor blades 108 of the wind turbine 100 are in an intermediate position, i.e. between the feather position and a spinning or power position. In addition, in particular embodiments, the sensors 204, 206, 208 may be used to measure the first and second wind conditions. More specifically, in one embodiment, the first and second wind conditions may be wind speeds at the wind turbine 100 measured at different moments in time.

Still referring to FIG. 4, as shown at (306), the method 300 may include estimating an acceleration parameter of the wind turbine 100 as a function of the first and second wind conditions (e.g. based on a difference, standard deviation, variance, etc. between the first and second wind conditions). For example, in one embodiment, the acceleration parameter of the wind turbine 100 may be a generator acceleration or a rotor acceleration, which are both wind indicators. In additional embodiments, the method 300 may include estimating the acceleration parameter of the wind turbine 100 based on the difference between the first and second wind conditions as well as the time between the first and second moments in time.

Thus, as shown at (308), the method 300 may include comparing the acceleration parameter to a predetermined threshold. In certain embodiments, the predetermined threshold may be determined, e.g. based on Weibull distribution of site wind speed. In addition, the predetermined threshold can be determined offline (i.e. via simulation and/or calculation), as well as online with measured data.

If the acceleration parameter is at or below the predetermined threshold, as shown at (312), the method 300 may include initializing a standard/slower startup process of the wind turbine 100. In contrast, if the acceleration parameter exceeds the predetermined threshold, as shown at (310), the method 300 may include initializing a faster startup process of the wind turbine 100. More specifically, in certain embodiments, the method 300 may include immediately initializing startup of the wind turbine 100 when the acceleration parameter exceeds the predetermined threshold so as to minimize or eliminate a wait time between measuring the first and second wind conditions and startup of the wind turbine 100. For example, in certain embodiments, the turbine controller 140 is configured to initialize startup of the wind turbine 100 by pitching the rotor blades 108 into the wind such that the rotor 106 begins to spin, releasing a brake of the rotor 106, yawing the nacelle 102 into the wind, and/or increasing a speed set point of the wind turbine 100.

Figure 5:
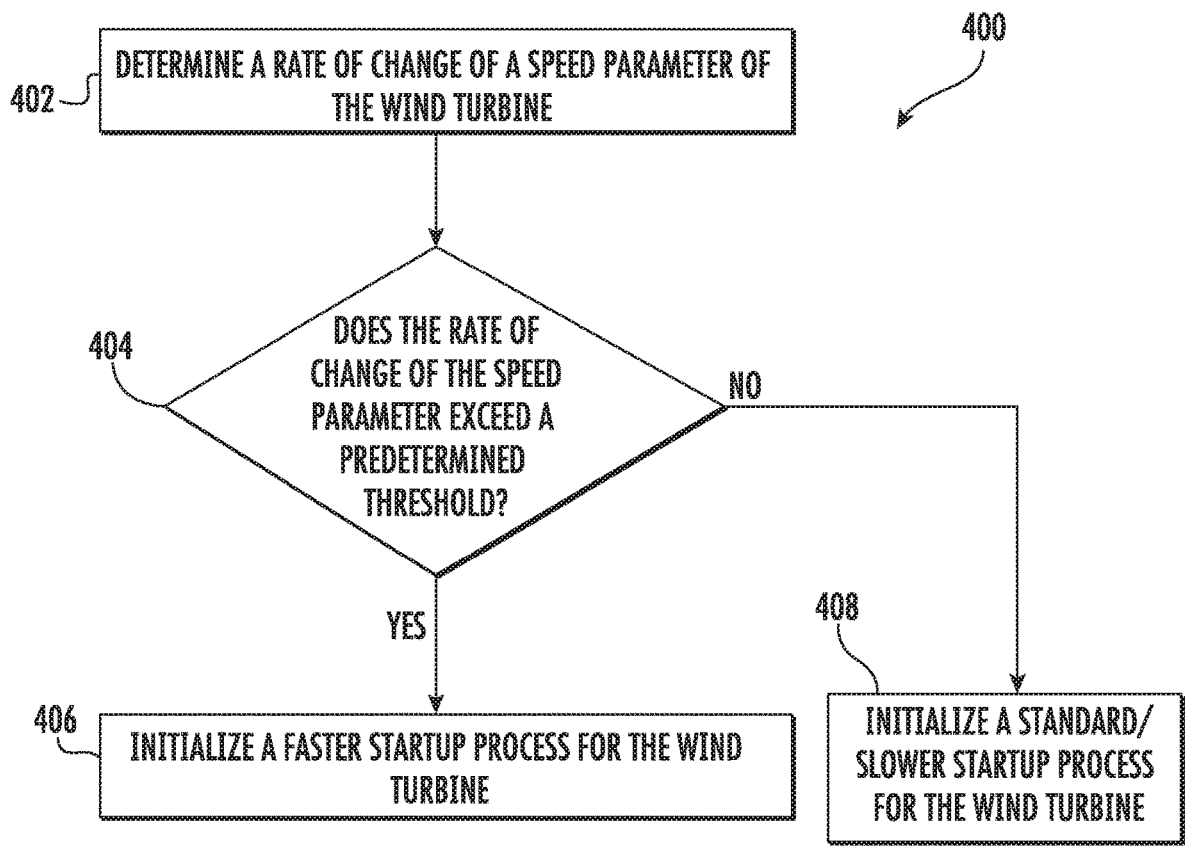
FIG. 5 illustrates a flow diagram of another embodiment of a method for initializing startup of a wind turbine according to the present disclosure.

Referring now to FIG. 5, a flow diagram of another embodiment of a method 400 for initializing startup of a wind turbine is illustrated. In general, the method 400 will be described herein with reference to the wind turbine 100 and controller 140 shown in FIGS. 1-3. However, it should be appreciated that the disclosed method 400 may be implemented with wind turbines having any other suitable configurations. In addition, although FIG. 5 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown at (402), the method 400 may include determining a rate of change of a speed parameter of the wind turbine 100. The rate of change of the speed parameter, for example, may be indicative of a wind speed at the wind turbine 100, energy in the wind (turbulence), as well as blade surface cleanliness (e.g. due to dirt, ice, etc. on the blades 108). For example, in one embodiment, the rate of change of the speed parameter may be a generator acceleration or a rotor acceleration of the wind turbine 100, both of which are wind speed indicators. In addition, it should be understood that the speed parameter may be measured by one or more sensors at a variety of locations (e.g. in the pitch system of the wind turbine 100, the tower 104, the hub 110, and/or on the low-speed shaft 114).

As shown at (404), the method 400 may include determining whether the rate of change of the speed parameter exceeds a predetermined threshold. If the rate of change of the speed parameter is at or below the predetermined threshold, as shown at (408), the method 400 may include initializing a standard/slower startup of the wind turbine 100. In contrast, if the rate of change of the speed parameter exceeds the predetermined threshold, as shown at (406), the method 400 may include initializing startup of the wind turbine 100.

For example, in one embodiment, the controller 140 is configured to determine the rate of change of the speed parameter of the wind turbine 100 by measuring a first wind speed at the wind turbine 100 when one or more rotor blades 108 are in a feathered position, measuring a second wind speed when the one or more rotor blades 108 are in an intermediate position between the feather position and a power position, and determining the rate of change as a function of the first and second wind speeds. In alternative embodiments, the controller 140 is configured to determine the rate of change of the speed parameter of the wind turbine 100 by directly measuring the rate of change of the generator acceleration or the rotor acceleration, e.g. via the sensor(s) 204, 206, 208.

Referring now to FIG. 6, it should also be understood that the wind turbine 100 described herein may be part of a wind farm 500 according to present disclosure. As shown, the wind farm 500 may include a plurality of wind turbines 502, including the wind turbine 100 described above, and a farm-level controller 504. For example, as shown in the illustrated embodiment, the wind farm 500 includes twelve wind turbines, including wind turbine 100. However, in other embodiments, the wind farm 500 may include any other number of wind turbines, such as less than twelve wind turbines or greater than twelve wind turbines. In one embodiment, the controller 140 of the wind turbine 100 may be communicatively coupled to the farm-level controller 504 through a wired connection, such as by connecting the controller 140 through suitable communicative links 506 or networks (e.g., a suitable cable). Alternatively, the controller 140 may be communicatively coupled to the farm-level controller 504 through a wireless connection, such as by using any suitable wireless communications protocol known in the art. In addition, the farm-level controller 504 may be generally configured similar to the controller 140 for each of the individual wind turbines 502 within the wind farm 500. Further, as shown, the wind farm 500 may include one or more farm sensors 508 communicatively coupled to the farm-level controller 504 for monitoring one or more wind parameters of the wind farm 500.

In such embodiments, the method 400 may include measuring, via the farm sensor(s) 508, one or more wind parameters from neighboring wind turbines 502 in the wind farm 500 and determining the predetermined threshold based on the wind parameter(s).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for initializing startup of a wind turbine, the method comprising:
    measuring, via one or more sensors, a first wind condition at the wind turbine at a first moment in time when one or more rotor blades of the wind turbine are in a feathered position;
    measuring, via the one or more sensors, a second wind condition at the wind turbine at a subsequent, second moment in time when the one or more rotor blades of the wind turbine are in an intermediate position between the feathered position and a power position;
    estimating, via one or more processors, an acceleration parameter of the wind turbine as a function of the first wind condition and the second wind condition;
    initializing, via the one or more processors, a first startup process for the wind turbine when the acceleration parameter is at or below a predetermined threshold; and
    initializing, via the one or more processors, a second startup process for the wind turbine when the acceleration parameter exceeds the predetermined threshold, the second startup process being faster than the first startup process, wherein the acceleration parameter being above the predetermined threshold indicates that wind conditions are favorable for the faster second startup process, the first and second startup processes each comprising, at least, increasing a speed set point of a rotor or a generator of the wind turbine.

2. The method of claim 1, wherein the first and second wind conditions comprise first and second wind speeds at the wind turbine.

3. The method of claim 1, wherein the acceleration parameter of the wind turbine comprises at least one of a generator acceleration or a rotor acceleration.

4. The method of claim 1, further comprising estimating the acceleration parameter of the wind turbine based on a difference between the first wind condition and the second wind condition and a time between the first and second moments in time.

5. The method of claim 1, further comprising immediately initializing the second startup process of the wind turbine when the acceleration parameter exceeds the predetermined threshold so as to minimize or eliminate a wait time between measuring the first and second wind conditions and the second startup process of the wind turbine.

6. The method of claim 1, wherein initializing the first and second startup processes of the wind turbine further comprises at least one of pitching one or more rotor blades of the wind turbine into the wind such that the rotor of the wind turbine begins to spin, releasing a brake of the rotor, yawing a nacelle of the wind turbine into the wind, and/or increasing the speed set point of the wind turbine.

7. A system for initializing startup of a wind turbine, the system comprising:
    one or more sensors for measuring a first wind condition and a second wind condition at a first moment in time when one or more rotor blades of the wind turbine are in a feathered position and a subsequent, second moment in time when the one or more rotor blades of the wind turbine are in an intermediate position between the feathered position and a power position; and,
    a controller communicatively coupled to the one or more sensors, the controller comprising at least one processor configured to perform one or more operations, the one or more operations comprising:
        estimating an acceleration parameter of the wind turbine as a function of the first wind condition and the second wind condition;
        initializing a first startup process for the wind turbine when the acceleration parameter is at or below a predetermined threshold; and
        initializing a second startup process for the wind turbine when the acceleration parameter exceeds the predetermined threshold, the second startup process being faster than the first startup process, wherein the acceleration parameter being above the predetermined threshold indicates that wind conditions are favorable for the faster second startup process, the first and second startup processes each comprising, at least, increasing a speed set point of a rotor or a generator of the wind turbine.

8. The system of claim 7, wherein the first and second wind conditions comprise a first wind speed and a second wind speed at the wind turbine.

9. The system of claim 7, wherein the acceleration parameter of the wind turbine comprises at least one of a generator acceleration or a rotor acceleration.

10. The system of claim 7, wherein the one or more operations further comprise estimating the acceleration parameter of the wind turbine based on a difference between the first wind condition and the second wind condition and a time between the first and second moments in time.

11. The system of claim 7, wherein the one or more operations further comprise immediately initializing the second startup process of the wind turbine when the acceleration parameter exceeds the predetermined threshold so as to minimize or eliminate a wait time between measuring the first and second wind conditions and the second startup process of the wind turbine.

12. The system of claim 7, wherein initializing the first and second startup processes of the wind turbine further comprises at least one of pitching one or more rotor blades of the wind turbine into the wind such that a rotor of the wind turbine begins to spin, releasing a brake of the rotor, yawing a nacelle of the wind turbine into the wind, and/or increasing the speed set point of the wind turbine.

13. A method for initializing startup of at least one wind turbine in a wind farm, the method comprising:
   measuring a first wind speed at the wind turbine when one or more rotor blades of the wind turbine are in a feathered position;
   measuring a second wind speed when the one or more rotor blades of the wind turbine are in an intermediate position between the feathered position and a power position;
   determining a rate of change as a function of the first and second wind speeds of the wind turbine; and,
   initializing a first startup process for the wind turbine when the rate of change is at or below a predetermined threshold; and
   initializing a second startup process for the wind turbine when the rate of change exceeds the predetermined threshold, the first and second startup processes each comprising, at least, increasing a speed set point of a rotor or a generator of the wind turbine.

14. The method of claim 13, wherein determining the rate of change further comprises directly measuring, via one or more turbine sensors, a rate of change of a generator acceleration or a rotor acceleration.

15. The method of claim 13, further comprising:
   measuring, via one or more farm sensors, one or more wind parameters from neighboring wind turbines in the wind farm; and,
   determining the predetermined threshold based on the one or more wind parameters.

\* \* \* \* \*